(12) United States Patent
Dunne

(10) Patent No.: US 9,151,603 B2
(45) Date of Patent: Oct. 6, 2015

(54) COMPACT FOLDED SIGNAL TRANSMISSION AND IMAGE VIEWING PATHWAY DESIGN AND VISUAL DISPLAY TECHNIQUE FOR LASER RANGEFINDING INSTRUMENTS

(75) Inventor: Jeremy G. Dunne, Parker, CO (US)

(73) Assignees: Laser Technology, Inc., Centennial, CO (US); Kama-Tech (HK) Limited, Tsim Sha Tsui, Hong Kong (CN)

( * ) Notice: Subject to any disclaimer, the term of this patent is extended or adjusted under 35 U.S.C. 154(b) by 0 days.

(21) Appl. No.: 13/615,238

(22) Filed: Sep. 13, 2012

(65) Prior Publication Data

US 2014/0071424 A1  Mar. 13, 2014

(51) Int. Cl.
G01C 3/00 (2006.01)
G01C 3/04 (2006.01)

(52) U.S. Cl.
CPC .......................................... *G01C 3/04* (2013.01)

(58) Field of Classification Search
USPC ........................... 356/3–5, 5.15, 141.1, 141.2; 359/833–838, 480–482, 629–640, 359/400–431, 399, 362; 250/342, 347
See application file for complete search history.

(56) References Cited

U.S. PATENT DOCUMENTS

| 6,236,504 | B1* | 5/2001 | Kao et al. ....................... 359/412 |
| 6,292,314 | B1 | 9/2001 | Perger |
| 6,344,894 | B1 | 2/2002 | Liou |
| 7,349,073 | B2 | 3/2008 | Dunne |
| 7,450,282 | B2 | 11/2008 | Dunne |
| 2013/0088413 | A1* | 4/2013 | Raffle et al. ....................... 345/7 |

* cited by examiner

*Primary Examiner* — Tri T Ton
(74) *Attorney, Agent, or Firm* — Hogan Lovells US LLP; Peter J. Meza; William J. Kubida

(57) ABSTRACT

A compact folded signal transmission and image viewing pathway design and visual display technique for laser rangefinding instruments incorporates a beam splitting cube in the eyepiece optical space and advantageously provides an objective image focal length substantially twice that of the physical length of the instrument optical components. Through the use of some of the same optical elements in both the image viewing pathway as well as the laser transmission pathway, a relatively long transmission focal length is provided which saves in both physical instrument space and component cost while also allowing for the use of reasonably sized photodiodes with improved power output over that of previous designs.

11 Claims, 3 Drawing Sheets

COMPACT FOLDED SIGNAL TRANSMISSION AND IMAGE VIEWING PATHWAY DESIGN AND VISUAL DISPLAY TECHNIQUE FOR LASER RANGEFINDING INSTRUMENTS

BACKGROUND OF THE INVENTION

The present invention relates, in general, to the field of distance measuring equipment. More particularly, the present invention relates to a compact folded signal transmission and image viewing pathway design and visual display technique for laser rangefinding instruments.

Representative implementations of optical pathways for various optical instruments, including laser-based rangefinders, are described in, for example, U.S. Pat. No. 6,236,504 issuing May 22, 2001 for "Method and Device for Adjusting Eye Range by Means of Displacements of Prisms and Ocular Lenses"; U.S. Pat. No. 6,292,314 issuing Sep. 18, 2001 for "Prism System for Image Inversion in a Visual Observation Beam Path"; and U.S. Pat. No. 6,344,894 issuing Feb. 5, 2002 for: "Optical Axis Adjusting Structure for a Range Finder". Designs representing decided improvements over those described in the aforementioned patents are disclosed in U.S. Pat. No. 7,349,073 for: "Efficient Optical System and Beam Pathway Design for Laser-Based Distance Measuring Device" and U.S. Pat. No. 7,450,282 for: "High Precision Optical System and Beam Pathway Design for a Laser-Based Distance Measuring Device", both assigned to Laser Technology, Inc., Englewood, Colo., and Kama-Tech (HK) Limited, Hong Kong, China assignees of the present invention, the disclosures of which are herein incorporated by this reference in their entirety.

While generally representative of the current state of the art in such designs, the aforementioned '504, '314, and '894 patents all describe systems of lenses and prisms which are relatively complex to implement, space inefficient, as well as costly to manufacture, assemble and align. Therefore, a need exists for a compact folded signal transmission and image viewing pathway design and visual display technique for laser rangefinding instruments which provides significant advantages over conventional designs while nevertheless providing an accurate foundation for a compact, professional rangefinder having excellent beam transmission/reception and optical properties for use in surveying or other demanding range-finding applications.

SUMMARY OF THE INVENTION

Disclosed herein is a compact, folded signal transmission and image viewing pathway design and visual display technique for laser rangefinding instruments which provides a sufficiently long objective focal length system in a relatively compact package. Through the provision of a sufficiently long eyepiece focal length, a beam splitting cube can be utilized in the eyepiece optical space instead of in the objective optical space of the image viewing pathway. The use of a beam splitting cube in such a manner obviates the use of a more expensive relay lens system and allows for the provision of visual displays at more than one visual plane, either straight through or at 90° to the beam splitting cube.

The compact folded image viewing pathway design and technique of the present invention advantageously provides an objective image focal length substantially twice that of the physical length of the instrument optical components which, in a representative embodiment disclosed herein, results in a objective focal length of approximately 130 mm compared to optical elements 65 mm in length while also providing a 6× magnification to an eyepiece eye relief of about 21.8 mm.

Through the use of some of the same optical elements in both the image viewing pathway as well as the laser transmission pathway, a relatively long transmission focal length is provided which saves in both physical instrument space and component cost while also allowing for the use of reasonably sized photodiodes with improved power output over that of previous designs. In a representative embodiment of the present invention disclosed herein, the laser transmission pathway and the image viewing pathway are in alignment thereby reducing undesired parallax which is important in the most stringent applications of a laser rangefinding instrument.

The compact folded image viewing pathway design and visual display technique of the present invention also advantageously allows for the utilization, and alternative or combined positioning, of various display devices (for target aiming reticule, distance information, operational mode, battery condition and the like) such as liquid crystal display (LCD) shutters, and projection systems such as back-lit LCDs, light emitting diodes (LEDs) and the like. In addition, photochromic glass may also be incorporated into the image viewing pathway which is operable in conjunction with an internally provided ultraviolet (UV) light source. In operation, with a suitable dichroic coating in the beam splitting device the contrast of the target image can be controlled, either by the user or automatically, such that the image viewing pathway is optimized with a minimum of loss for all operational situations between low and bright light ambient conditions.

Particularly disclosed herein is a laser rangefinding instrument which includes an image viewing pathway interposed between a first side of the instrument directed toward a target and a second opposite side adjacent a viewer of the target through the instrument. The image viewing pathway comprises a first portion for redirecting an image of the target through substantially 90° in a first direction and a second portion for subsequently redirecting the image of the target through substantially 90° in a second opposite direction.

Also particularly disclosed herein is a laser rangefinder which comprises a laser energy emitting device, a laser emitting aperture in the laser rangefinder and a laser transmission pathway in the rangefinder for redirecting a laser beam from the laser emitting device through 450° to the laser emitting aperture.

Still further disclosed herein is a laser rangefinder which comprises a laser transmission pathway for directing laser energy toward a target and a laser reception pathway for receiving at least a portion of the laser energy reflected from the target. The rangefinder further comprises an image viewing pathway for providing an image of the target to an eyepiece of the rangefinder and a visual display device disposed in at least one of two image planes viewable through the eyepiece. The image viewing pathway comprises a beam splitting cube providing the image of the target and the visual display to the eyepiece.

Also further disclosed herein is a laser rangefinder which includes an image viewing pathway and comprises an adjustable contrast element in the image pathway. In a representative embodiment of the present invention, the adjustable contrast element may comprise photochromic glass in conjunction with an ultraviolet light emitting diode. The adjustable contrast element may be selectively adjustable by a user of the laser rangefinder or automatically adjustable in response to ambient lighting conditions or light levels on the image pathway.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
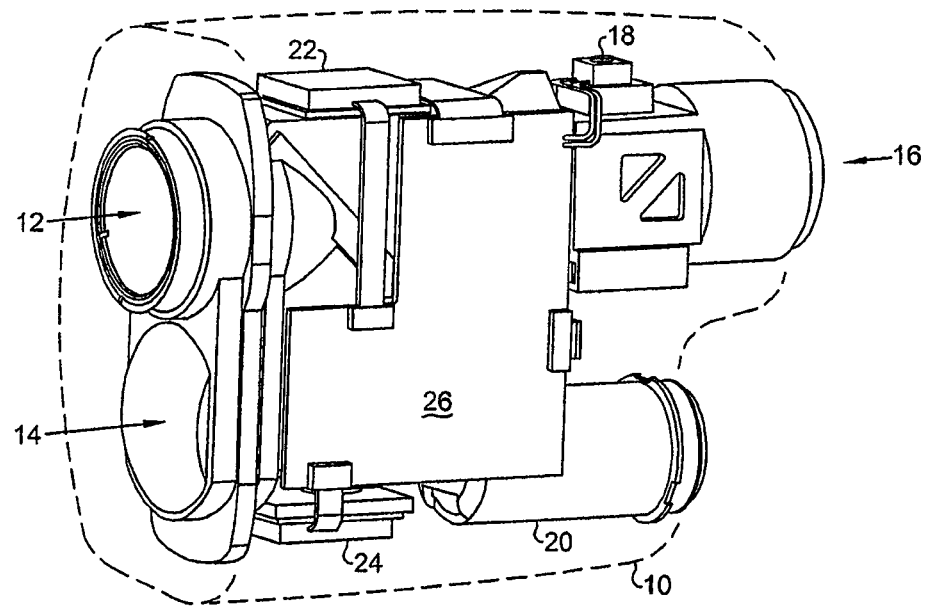
FIG. 1 is a partially cut-away perspective view of a representative embodiment of a rangefinding instrument in accordance with the present invention illustrating some of the internal structure thereof.

With reference now to FIG. 1, a partially cut-away perspective view of a representative embodiment of a rangefinding instrument 10 in accordance with the present invention is shown illustrating some of the internal structure thereof. The instrument 10 is illustrated in the form of a portable, hand held device which may be operated by a user and affording single handed operation.

A laser beam emission and target viewing port 12 enables a user to aim the instrument 10 at a particular target as to which distance is to be measured and sight the instrument 10 directly at the point to which the laser beam is emitted. Laser energy returned to the instrument 10 is received through the laser reception port 14 located below the laser beam emission and target viewing port 12. In operation, the user sights the instrument 10 and directs the laser beam toward the target by holding the viewing port 16 adjacent one eye. In addition to the view of the target accorded the user through the laser beam emission and target viewing port 12, an in-sight display of an aiming reticule, distance to the target and other information may additionally be provided in the viewing plane as will be more fully described hereinafter.

The instrument 10 fires a series of laser pulses to the target when the user initiates the firing button 18. Power for the laser and functions of the instrument 10 is provided by a battery, not shown, maintained within a battery case 20. The battery provides power, inter alia, for a laser emitting section 22, a laser signal detecting section 24 and their associated circuitry on circuit board 26.

Figure 2:
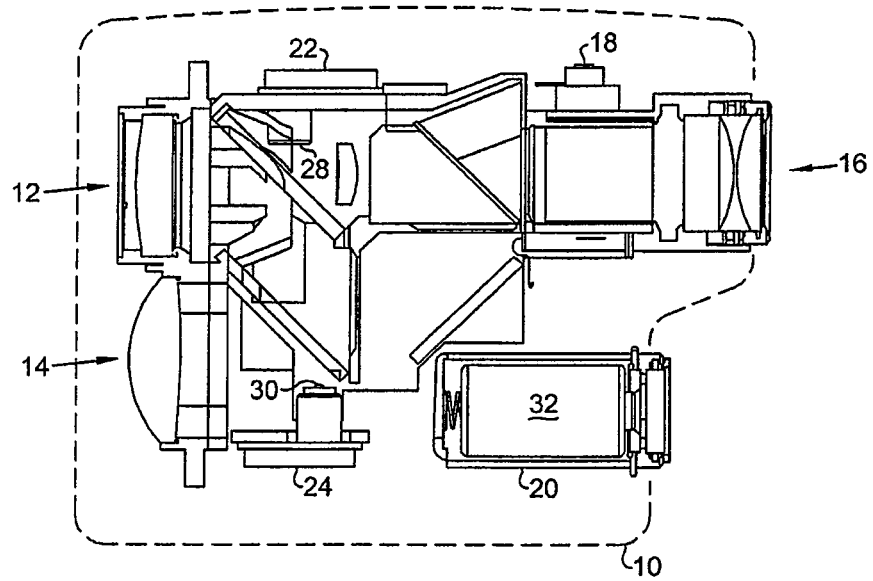
FIG. 2 is a further cut-away, side elevational view of the representative embodiment of the instrument of the preceding figure.

With reference additionally now to FIG. 2, a further cut-away, side elevational view of the representative embodiment of the instrument 10 of the preceding figure is shown. With respect to this figure, like structure is like numbered and the foregoing description thereof shall suffice herefor. In this view, the laser emitting diode 28 of the laser emitting section 22 and the laser detecting diode 30 of the laser signal detecting section 24 are shown along with the battery 32 for providing operational power to the instrument 10.

Figure 3:
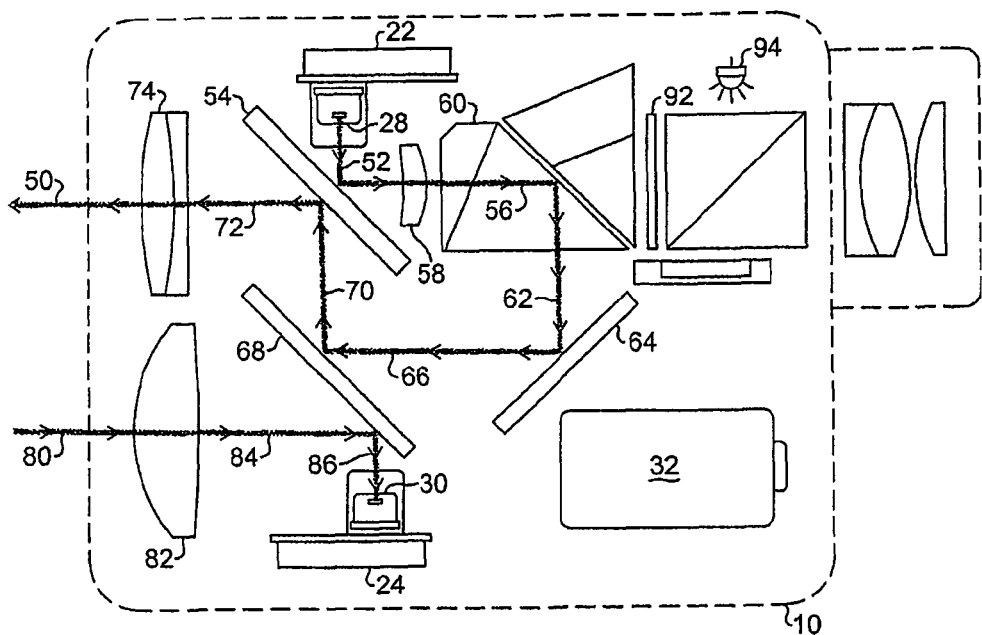
FIG. 3 is a simplified representation of the laser transmission and laser reception pathways of the representative embodiment of the instrument of the present invention illustrated in the preceding figures.

With reference additionally now to FIG. 3, a simplified representation of the laser transmission and laser reception pathways of the representative embodiment of the instrument 10 of the present invention of the preceding figures is shown. The instrument 10 has a folded laser transmission pathway 50 between the laser emitting diode 28 and the laser beam emission and target viewing port 12 for directing a laser signal toward a target.

The laser transmission pathway 50 comprises a first beam portion 52 between the laser emitting diode 28 and a first laser beam redirection device in the form of a mirror 54. The mirror 54 then redirects the first beam portion 52 90° in a first direction to produce a second beam portion 56 through a positive meniscus lens 58 to another laser beam redirection device in the form of a prism cluster 60 which has an infrared (IR) transmissive and visible light reflective surface wherein the second beam portion 56 is then redirected 90° in a second opposite direction by total internal reflection to produce a third beam portion 62. This third beam portion 62 is then redirected by another beam redirection device 90° in the second direction by means of a second mirror 64 to produce a fourth beam portion 66 which, in turn, is then further redirected 90° in the same second direction by a beam redirection device in the form of a third mirror 68 to produce a fifth beam portion 70. A further beam redirection device in the form of an opposite reflective side of mirror 54 then redirects the fifth beam portion 70 90° in the first direction to form a sixth beam portion 72 which is then directed through an objective lens 74 at the laser beam emission and target viewing port 12 to a target towards which the instrument 10 is aimed.

Laser energy which is reflected from the target enters the instrument 10 through the laser reception port 14 along a laser reception pathway 80 to aspheric lens 82. A first received beam portion 84 then is redirected 90° by an opposite reflective side of mirror 68 to a laser detecting diode 30.

Figure 4:
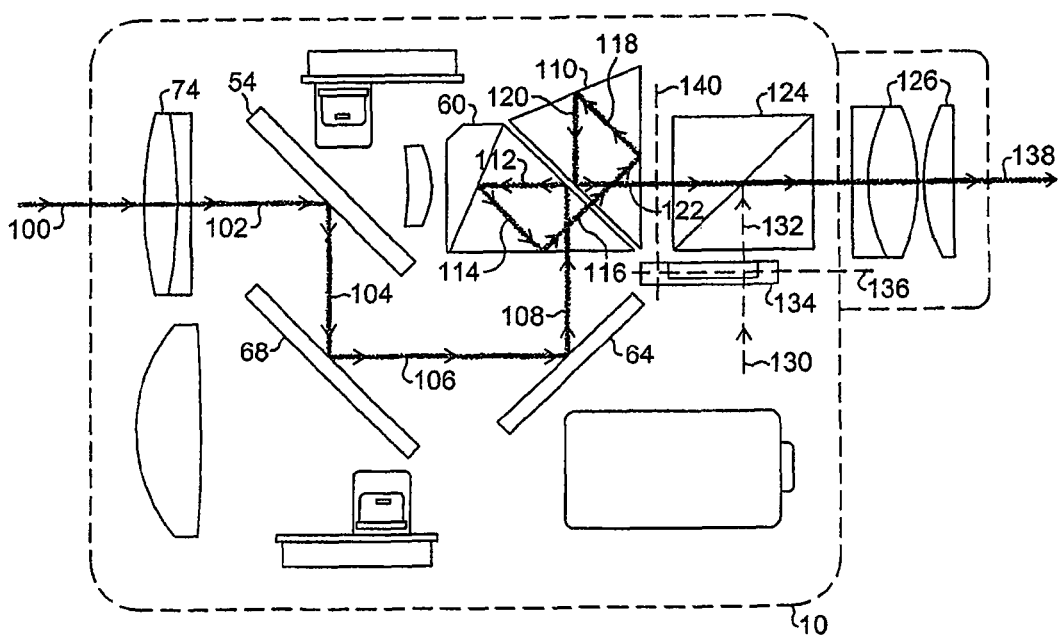
FIG. 4 is a corresponding representation of the visual pathway for presenting a view of a target to user of the rangefinding instrument of the preceding figures and illustrating its redirection along at least a portion of the laser transmission pathway of FIG. 3.

With reference additionally now to FIG. 4, a corresponding representation of the visual, or optical, pathway for presenting a view of a target to user of the rangefinding instrument 10 of the preceding figures is shown and illustrates its redirection along at least a portion of the laser transmission pathway 50 of FIG. 3.

The visual pathway 100 of the device gives the user of the instrument 10 a precise view of the point on the target towards which one or more laser pulses have been directed through the laser transmission pathway 50 (FIG. 3) and is at least partially coextensive therewith as will be more fully described hereinafter. The visual pathway 100 presents an image of the target and surrounding area through the laser beam emission and target viewing port 12 and objective lens 74.

The visual pathway 100 comprises a first image portion 102 which is redirected 90° in a first, clockwise direction by a reflective surface of the third mirror 54 to produce a second image portion 104 which, in turn, is redirected 90° in a second opposite, counter-clockwise direction by a reflective surface of the second mirror 68 to produce a third image portion 106. The third image portion of the visual pathway 100 is then redirected 90° in the same second, counter-clockwise direction by the first mirror 64 to produce a fourth image portion 108 which is reflected by the surface of prism cluster 60 by 90° in the same second, counter-clockwise direction to produce a fifth image portion 112. The fifth image portion 112 is then redirected 45° in the same second, counter-clockwise direction by the visible light reflective dichroic surface of prism cluster 60 to produce a sixth image portion 114 which, in turn, is then redirected 90° in the same second, counter-clockwise direction to produce a seventh image portion 116.

The seventh image portion 116 then passes into prism 110 where it is also redirected 90° in the second, counter-clockwise direction to produce an eighth image portion 118 which is then redirected 45° in the second, counter-clockwise direction to produce ninth image portion 120 which, in turn is then redirected 90° in the second, counter-clockwise direction to produce a tenth image portion 122. The tenth image portion 122 is then directed through a beam splitter cube 124 and the eyepiece lenses 126 to the viewer of the target towards which the instrument 10 is aimed.

Superimposed along at least a portion of the tenth image portion 122 is a display pathway 130 which may provide to the user of the instrument 10 an aiming reticule and various other visual indicia of the distance to the target and other instrument 10 operational parameters. The display pathway 130 comprises a first display portion 132 and presents the information displayed on a display device 134 located in a first image plane 136 to the beam splitter cube 124. Display devices which might be utilized at the first image plane 136 comprise back-lit liquid crystal (LCD) displays, light emitting diode (LED) displays and similar image projection systems.

The beam splitter cube 124 then redirects the first display portion 132 90° to a second display portion 138 which is coextensive with at least a portion of the tenth image portion 122 for presentation to a user of the instrument 10 through the viewing port 16.

Alternatively, a display device or adjustable contrast element 92 (illustrated in FIG. 3 for sake of clarity) may be located between the prism 110 and the beam splitter cube 124 such that it lies directly along, and coextensive with, the tenth image portion 122 at second image plane 140. Suitable display devices include LCD shutter displays, LCD transmissive displays, polymer-organic LED (P-OLED) displays and the like.

This display device 92 may be in substitution for, or in addition to, the display device 134. Representative display devices and the types of information displayed are disclosed in U.S. Pat. Nos. 7,349,073 and 7,450,282 which are assigned to the assignees of the present invention. The disclosures of these patents are herein specifically incorporated by reference in their entirety.

In addition, an adjustable contrast element 92 may be interposed between the beam splitting device 124 and the tenth image portion 122 of the visual pathway 100 at the second image plane 140. The adjustable contrast element 92 may comprise photochromic glass in conjunction with an ultraviolet (UV) light emitting diode (LED) 94 (also illustrated in FIG. 3 for sake of clarity) to either manually, or automatically, adjust the target image contrast for low to bright light conditions. This adjustable contrast element may also be in substitution for, or in addition to, the display device 134 or other display device 92. The adjustable contrast element 92 may be adjustable through manual setting by a user of the laser rangefinder 10 or could be automatically adjustable in response to ambient lighting associated with the surrounding light level or along the visual pathway 100.

Figure 5:
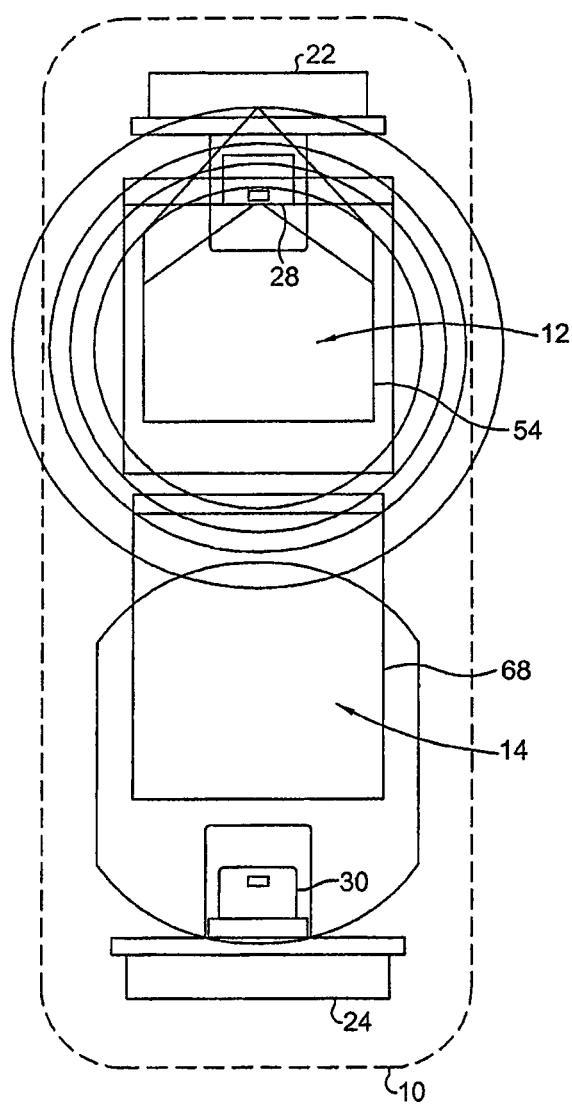
FIG. 5 is a partially cut-away front elevational view of the rangefinding instrument of the preceding figures showing the laser beam emission and target viewing port as well as the laser reception port.

With reference additionally now to FIG. 5, a partially cutaway front elevational view of the rangefinding instrument 10 of the preceding figures is shown illustrating the laser beam emission and target viewing port 12 as well as the laser reception port 14. With respect to this figure, like structure to that previously illustrated and described is like numbered and the foregoing description thereof shall suffice herefor.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A laser rangefinding instrument including an image viewing pathway in said instrument interposed between a first side of said instrument directed toward a target and a second opposite side of said instrument adjacent a viewer of said target through said instrument comprising:
   a first portion of said image viewing pathway comprising a first mirror for redirecting an image of said target through substantially 90° in a first clockwise direction;
   a second portion of said image viewing pathway comprising second and third mirrors, a prism and prism cluster for subsequently redirecting said image of said target through substantially 90° in a second counterclockwise direction opposite to said first clockwise direction; and
   a laser transmission pathway for direction laser energy toward said target, said laser transmission pathway comprising said prism cluster and said first, second and third mirrors.

2. The laser rangefinding instrument of claim 1 further comprising a beam splitting device interposed between said second portion of said image viewing pathway and an eyepiece of said rangefinding instrument.

3. The laser rangefinding instrument of claim 1 further comprising a visual display interposed on said image viewing pathway.

4. The laser rangefinding instrument of claim 3 wherein said visual display comprises one of an LCD shutter display, LCD transmissive display or P-OLED display.

5. The laser rangefinding instrument of claim 1 further comprising an adjustable contrast element interposed on said image viewing pathway.

6. The laser rangefinding instrument of claim 5 wherein said adjustable contrast element comprises photochromic glass.

7. The laser rangefinding instrument of claim 6 wherein said adjustable contrast element comprises an associated light source.

8. The laser rangefinding instrument of claim 7 wherein said light source comprises a UV LED.

9. The laser rangefinding instrument of claim 2 further comprising a visual display device viewable through said eyepiece disposed in an image plane at 90° to a portion of said image viewing pathway directly through said beam splitting cube.

10. The laser rangefinding instrument of claim 9 wherein said visual display device comprises an image projection system.

11. The laser rangefinding instrument of claim 10 wherein said image projection system comprises one of a back-lit LCD display or LED display.

\* \* \* \* \*